United States Patent [19]

Kawabata et al.

[11] Patent Number: 4,677,535
[45] Date of Patent: Jun. 30, 1987

[54] POWER CONVERSION SYSTEM

[75] Inventors: Takao Kawabata; Shigenori Higashino, both of Hyogo, Japan

[73] Assignee: Mitsubishi Denki Kabushiki Kaisha, Tokyo, Japan

[21] Appl. No.: 826,930

[22] Filed: Feb. 7, 1986

[30] Foreign Application Priority Data

Apr. 30, 1985 [JP] Japan .................................. 60-92691

[51] Int. Cl.$^4$ ........................... H02M 7/00; H02J 1/10
[52] U.S. Cl. ....................................... 363/65; 363/71; 307/58; 307/82; 307/87
[58] Field of Search ................. 363/65, 71, 72, 95-98; 307/58, 82, 87

[56] References Cited

U.S. PATENT DOCUMENTS

| 3,675,037 | 7/1972 | Hamilton | 307/58 X |
| 3,823,327 | 7/1974 | Bayer | 307/58 |
| 3,864,620 | 2/1975 | Abbondanti | 363/71 |
| 4,276,590 | 6/1981 | Hansel et al. | 307/82 X |

OTHER PUBLICATIONS

Takao Kawabata et al., Large Capacity Parallel Redundant Transistor UPS, 1983, pp. 660-671.

Primary Examiner—Patrick R. Salce
Assistant Examiner—Emanuel Todd Voeltz
Attorney, Agent, or Firm—Bernard, Rothwell & Brown

[57] ABSTRACT

In a conversion system including a plurality of converter units connected to supply a.c. outputs to a load through a common bus, each converter unit includes a simulation bus circuit adapted to detect simulated lateral current between the converter units. Thus, testing of parallel operation control circuit can be executed easily, based on the simulated lateral current before paralleling the main circuit.

8 Claims, 11 Drawing Figures

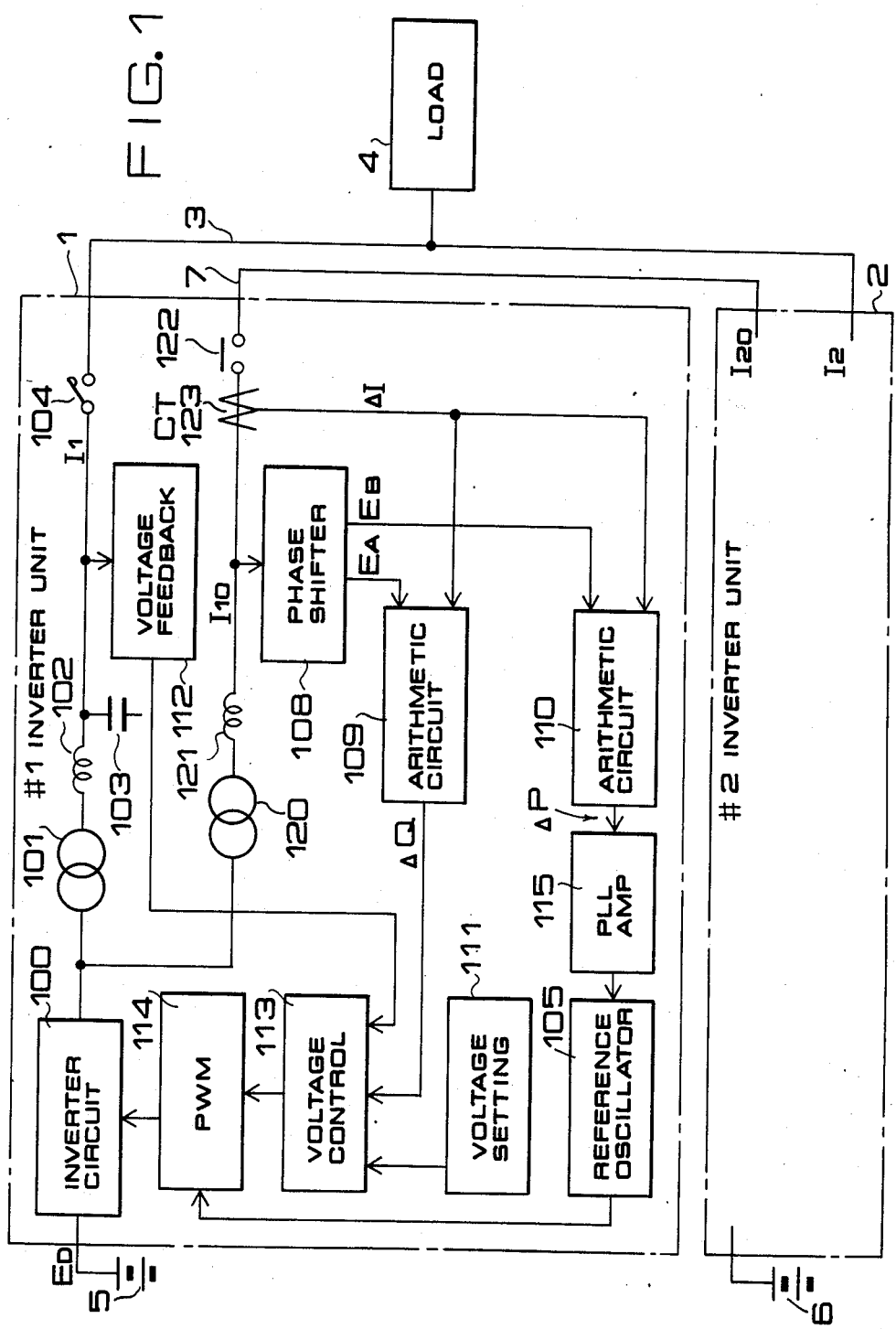

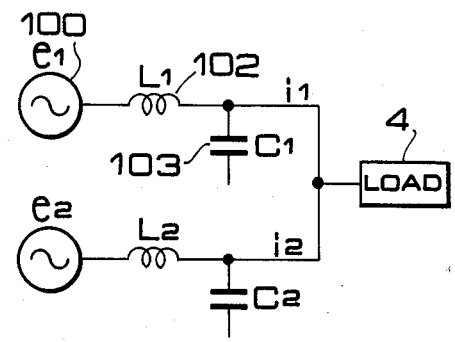
FIG. 2(a)
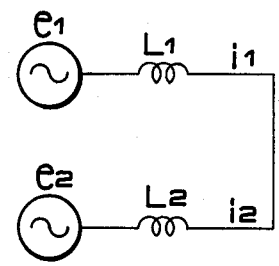
FIG. 2(b)
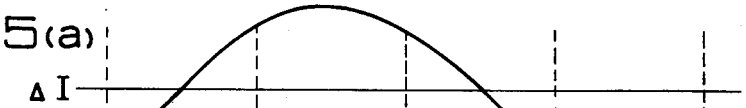
FIG. 5(a) ΔI
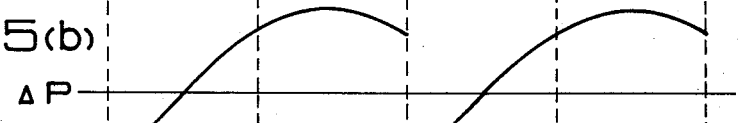
FIG. 5(b) ΔP
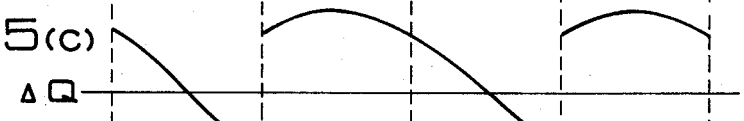
FIG. 5(c) ΔQ
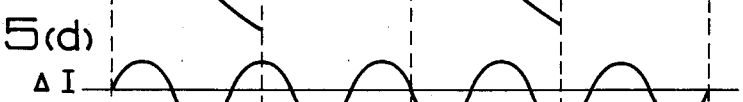
FIG. 5(d) ΔI
FIG. 5(e) ΔP
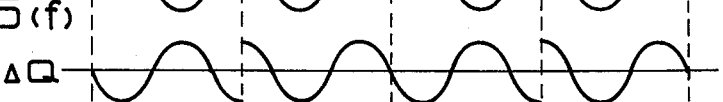
FIG. 5(f) ΔQ

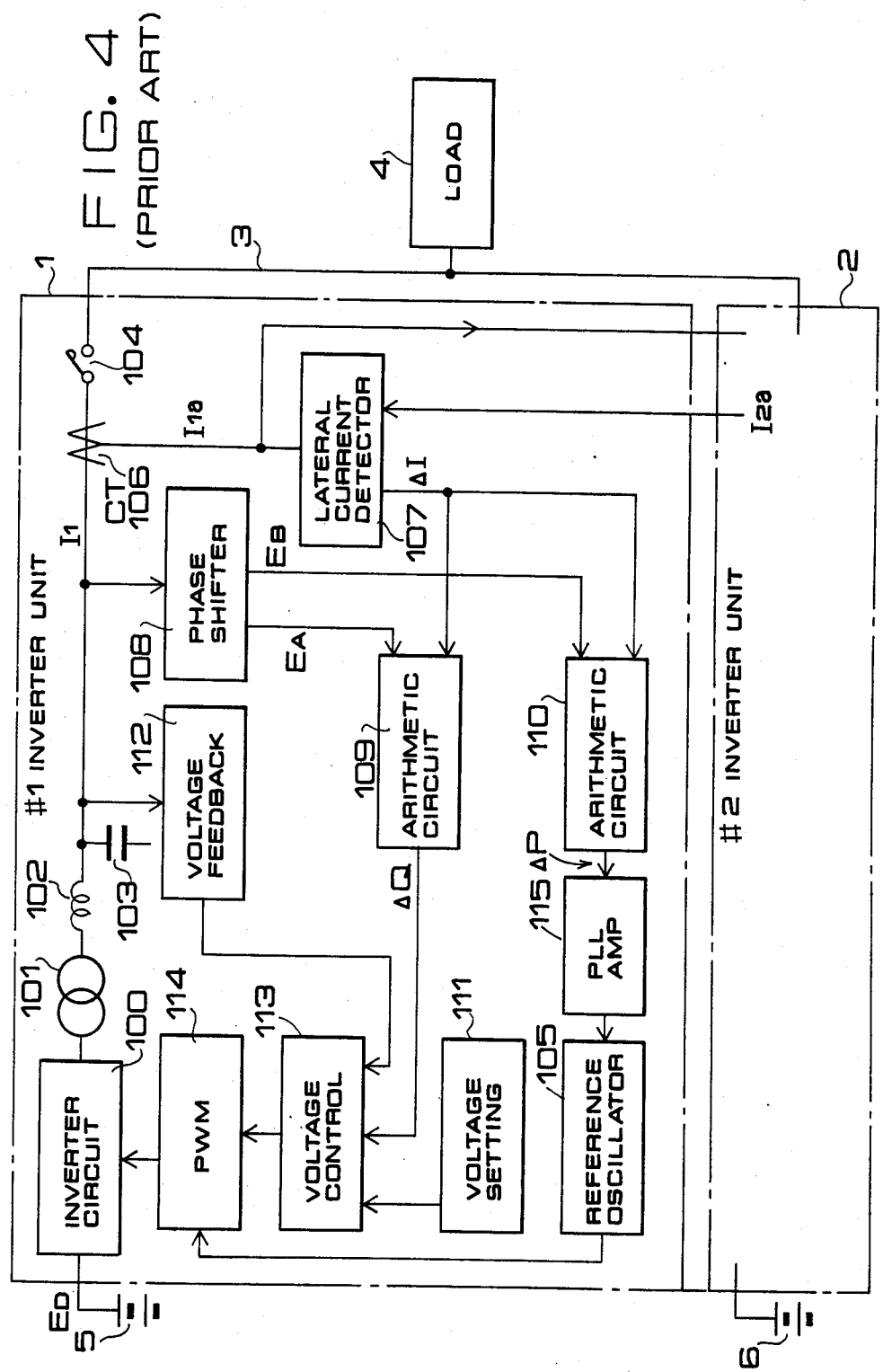

POWER CONVERSION SYSTEM

BACKGROUND OF THE INVENTION

1. Field of the Invention

The present invention relates to a power conversion system including a plurality of conversion units having substantially the same structure and operating in parallel to supply a.c. power to a common load.

2. Description of the Prior Art

FIG. 4 shows a conventional inverter system of the prior art disclosed in Japanese Published Patent Applications Nos. 53-36137 and 56-13101. In the figure, #1 and #2 inverter units 1 and 2 having the same construction are operated in parallel to supply power through an output bus 3 to a load 4.

The inverter unit 1 comprises an inverter circuit 100, an output transformer 101, and a reactor 102 and a capacitor 103 constituting a filter. The inverter unit 1 converts power supplied from a d.c. power source 5 into a.c. power, which is conducted through an output switch 104 to the output bus 3.

Next, the operation of the above inverter system will be described. When the parallel operation of the two inverter units 1 and 2 is necessary, the output current $I_1$ of the #1 inverter unit 1 is detected as a signal $I_{1a}$ by a current transformer (CT) 106, and in the same way the output current of the #2 inverter unit 2 is detected as a signal $I_{2a}$. A lateral current detector 107 provided in the inverter unit 1 evaluates the difference between $I_{1a}$ and $I_{2a}$ to produce a signal $\Delta I$ representing a lateral current flowing between the units. A phase shifter 108 produces two perpendicularly-intersecting voltage vectors $E_A$ and $E_B$, and arithmetic circuits 109 and 110 evaluate the reactive power component $\Delta Q$ and effective power component $\Delta P$ based on the detected signal $\Delta I$ and the respective voltage vectors $E_A$ and $E_B$. Based on the signals provided by a voltage setting circuit 111 and voltage feedback circuit 112, a voltage control circuit 113 operates on a pulse width modulation (PWM) circuit 114 to implement pulse width modulation for the inverter circuit 100, thereby controlling the output voltage.

The above-mentioned reactive power component $\Delta Q$ is given to the voltage control circuit 113 as a supplementary signal, so that the reactive power component $\Delta Q$ is nullified by regulating the inverter output voltage within a few percent range. The effective power component value $\Delta P$ is fed through an amplifier 115 constituting a PLL circuit to a reference oscillator 105 so that its output frequency is adjusted finely, thereby controlling the phase of inverter output voltage to nullify the effective power component $\Delta P$.

By controlling the inverter output voltage and phase so as to nullify both of the reactive and effective power components $\Delta Q$ and $\Delta P$, no lateral current flows between the two inverter units and the load is shared stably by the units.

The conventional inverter system employing the parallel operation system as described above, needs a test as to whether it operates normally as expected, and the only test method is to operate the system by connecting the first and second inverter units 1 and 2 to the output bus 3 in FIG. 4. However, as is known in the art, the usual inverter has an overcurrent withstanding capability of only 150% of the rated current in general, and therefore it is extremely difficult to test the control circuit and adjust the response of control while actually operating the system of FIG. 4.

In practice, individual components of the control circuit shown in FIG. 4 are tested and adjusted completely and wiring between the components is checked before conducting the running test for the overall system shown in FIG. 4. Even with such a prudent procedure for the parallel operation, it frequently occurs that an unexpected fault causes an excessive lateral current and the inverter fails to commutate, resulting in a damage to the system. This implies difficulties in investigating a fault (particularly an intermittent fault such as that caused by a faulty electric contact) and also in conducting a periodical maintenance service.

In such a control instability is caused by an unexpected harmonic lateral current included in the output current $I_1$ of each inverter unit; harmonic current in large proportions including in the detected lateral current signal $\Delta I$ disturbs the detection of the intersecting current components, causing the instability. In this case, the output filter capacitor 103 provided for each inverter unit forms a resonance circuit in conjunction with other capacitors of other inverter units through the inductance of output bus 3. The resonance frequencies, which depend on the length of wiring, are in many cases relatively high above the seventh harmonic. Harmonics created by any of the parallel-connected inverter units resonate in this resonance circuit, yielding a very large harmonic lateral current. In the case of synchronized rectifying circuits used as the arithmetic circuits 109 and 110, the harmonic lateral current produces the following signals. FIG. 5(b) and (c) shows the signals $\Delta P$ and $\Delta Q$ derived from a fundamental lateral current signal $\Delta I$ shown in FIG. 5(a) through the synchronized rectification. Assuming a case that the signal $\Delta I$ is not of the fundamental component, but a $\Delta I$ of the fifth harmonic component exists as a harmonic lateral current as shown by (d) in FIG. 5. Synchronized rectification for this signal yields a $\Delta P$ component signal shown by (e) and a $\Delta Q$ component signal shown by (f) in FIG. 5. The $\Delta Q$ signal averages out to zero, while the $\Delta P$ signal remains in its positive parts as shown by hatching. A positive $\Delta P$ signal indicates an excessive share of effective power by the associated inverter unit, causing the PLL amplifier 115 to lower temporarily the oscillation frequency so as to produce a lag phase of the inverter unit 1. The harmonic lateral current shown at (d) in FIG. 5 has an opposite phase for the inverter unit 2, causing its $\Delta P$ signal to be negative, and the amplifier 115 in the inverter unit 2 operates to lead the phase of the inverter unit 2. In actual operation, however, there is no lateral current of the fundamental component between the inverter units 1 and 2, requiring no adjustment for the phase difference, and the above-mentioned PLL circuit operation in response to the $\Delta P$ signal is erroneous, resulting in an increased lateral current of the fundamental component and eventually in the instability of parallel operation. Although in the exemplary case shown by (d), (e) and (f) in FIG. 5 the fifth harmonic wave has a phase relationship with the fundamental wave as shown, in actual operation various phase relationships occur, so both the $\Delta P$ and $\Delta Q$ signals will have various values in even positive and negative. Therefore, instability arises not only in the phase control, but also in the voltage control due to an erroneous $\Delta Q$ signal. Although the example of FIG. 5 deals with the fifth harmonic wave for the sake of simplicity, it will be apparent that abnormal $\Delta P$ and $\Delta Q$ signals can equally result generally for the nth harmonic wave. In general, the nth harmonic wave exerts an influence of 1/n gain on the system as a result of synchronized rectification, disturbing the control system of a parallel operating inverter system as shown in FIG. 4.

In order to overcome the foregoing problems, there is known a method of multiplicatiion between the signal ΔI and sinusoidal $E_A$ and $E_B$ signals using multipliers as arithmetic circuits 109 and 110. However, multipliers are generally complex in construction, and therefore relatively susceptible to failure, and expensive. On this account, it is very desirable for the system as shown in FIG. 4 to employ simpler and more reliable synchronized rectification circuits.

SUMMARY OF THE INVENTION

It is an object of the present invention to provide a parallel-operating power conversion system which allows testing and adjustment of parallel operation control without actually operating the main circuits in parallel, but merely using the control circuit, and also allows stable load sharing in parallel operation even if a harmonic lateral current flows between the main circuits.

The inventive system includes a plurality of converter units whose output is connected to a load bus and further to its converter circuit connected to the load bus and further including a simulation bus circuit connected through a simulation bus to counterparts of all remaining converter units. The output voltage and frequency of the converter circuit are controlled based on the reactive and effective power detected on the simulated bus circuits. Since the simulation bus circuit of one converter unit is connected with the simulation bus circuits of other converter units, the output voltage and frequency of one converter circuit can be made consistent, prior to its connection to the bus, with the output of other conversion units already connected to the bus.

In one aspect of the present invention, the power conversion system comprises a plurality of converter units having their output terminals connected through a common bus to a load. Each converter unit includes a circuit for converting a d.c. or a.c. input power into an a.c. power of an intended voltage and frequency, an impedance element connected through a switch between the output terminal of the converter circuit and the bus, a simulation bus circuit including an impedance element connected to the output terminal of at least one converter pole of the converter circuit, and a means for controlling the output voltage and frequency of the converter circuit on the basis of the current on the simulation bus circuit, with one end of the simulation bus circuit being connected through the simulation bus with one end of other simulation bus circuit of all remaining converter units.

The conversion circuit is typically a voltage type or current type inverter, but it may be a converter of any type such as a cycloconverter. The present invention can also be applied to a rectangular wave output inverter of variable frequency and variable voltage. The converter circuit of each converter unit may be same or may be different.

BRIEF DESCRIPTION OF THE DRAWINGS

FIG. 1 is a block diagram showing the inventive power converter system including two inverter units;

FIG. 2a is an equivalent circuit of the main circuit in the power converter system shown in FIG. 1;

FIG. 2b is an equivalent circuit of the simulation bus circuit of FIG. 1;

FIG. 4 is a block diagram showing a conventional power conversion system of the prior art; and FIG. 5 is a waveform diagram showing the signals observed in the synchronized rectification circuit used for detection of ΔP and ΔQ signals.

DETAILED DESCRIPTION OF THE PREFERRED EMBODIMENTS

Figure 3:
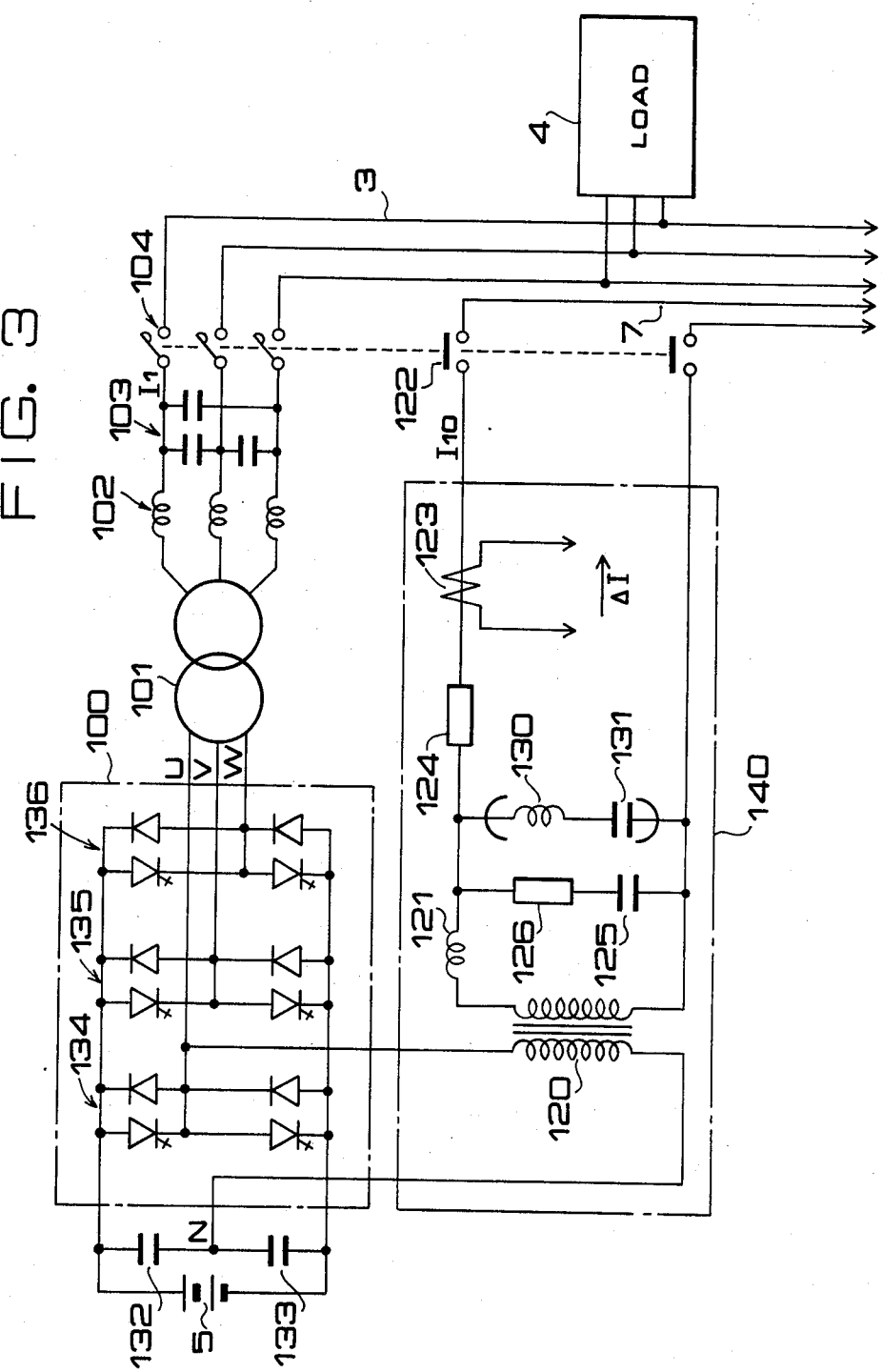
FIG. 3 is a schematic diagram showing in part another embodiment of the present invention.

In FIG. 1 is illustrated an inverter system embodying this invention including two inverter units 1 and 2. The inverter units 1 and 2 have substantially the same structure, and the following description on unit 1 is applicable also to unit 2. The first inverter unit 1 comprises an inverter circuit 100, an output transformer 101, a reactor 102 and capacitor 103 constituting a filter in combination, an output switch 104, a reference oscillator 105, a phase shifter 108, arithmetic circuits 109 and 110, a voltage setting circuit 111, a voltage feedback circuit 112, a voltage control circuit 113, a PWM circuit 114, and a PLL amplifier 115. These system elements are substantially identical to those used in the conventional inverter unit as described previously in connection with FIG. 4 and detailed explanation thereof will be omitted here. The inverter units 1 and 2 can supply their a.c. outputs through the output switches to a load 4 on the common bus, as in the arrangement of FIG. 4.

In this inverter system, the inverter unit 1 has a transformer 120 connected to the output of the inverter circuit 100, with its secondary winding being connected to a simulation bus 7 through a reactor 121 serving as a simulation bus circuit, a current transformer 123 and a switch 122. The phase shifter 108 has its input terminal connected through the reactor 121 to the secondary winding of the insulation transformer 120. As another modification the phase shifter can be connected to the capacitor 103. The transformer 120 may be of a small one having a power capacity of less than 1 kVA for the inverter 100 having a power capacity of more than 100 kVA. The secondary voltage of the transformer 120 can be chosen arbitrarily, e.g., 100 volts.

Next the operation of the inverter unit 1 will be described. Assuming the current rating of the reactor 121 to be 1 ampere in correspondence to the rated current of the inverter circuit 100 and further assuming the composite impedance of the main reactor 102 and transformer 101 to be 10 percent, the composite impedance of the reactor 121 and transformer 120 is set to 10Ω. Similarly, both combinations preferably have impedance angles selected as near as possible.

By setting the circuit parameters as mentioned above, the circuit connected to the simulation bus 7 constitutes a model of the parallel-operating main circuit excluding the filter capacitor and load in FIG. 1. Namely, the main circuit has a complete equivalent circuit shown in FIG. 2a, while the above-mentioned model is expressed as shown in FIG. 2b. The current $I_1$ in FIG. 2a includes both the lateral current and the load current, whereas the current in FIG. 2b is solely the lateral current, and therefore a current $I_{10}$ in FIG. 1 representing the lateral current ΔI can be obtained without the use of the lateral current detecting circuit 107 shown in FIG. 4. Accordingly, through the 1A/0.1A conversion, for example, by a current transformer (CT) 123 to produce the lateral current signal ΔI, the same control operation as described in connection with FIG. 4 can be executed.

FIG. 3 shows another embodiment of this invention, in which the same portions as those of FIG. 1 are omitted for the sake of simplicity, but the lateral current evaluating circuit is shown in detail. The components having the same functions as those of FIG. 1 are referred to by the common symbols and explanation thereof is omitted.

In the figure, the power conversion system comprises a transformer 120 having a primary winding connected between the neutral point N of the d.c. power source at the node of serial-connected capacitors 132 and 133 and phase U representing the three-phase output of inverter poles 134, 135 and 136. For the enhanced analogy to the main circuit, the transformer secondary circuit is provided with a capacitor 125 in correspondence to the filter capacitor 103 in serial connectiion with a damping resistor 126 which prevents resonance of the capacitor 125 with the counterpart in the second inverter unit 2. The damping resistor 126 may also be arranged in series to the switch 122 as shown by resistor 124 in the figure. The transformer secondary circuit may further be provided with a combination of a reactor 130 and capacitor 131 serving as a resonance filter which does not exist in the main circuit, so that harmonic components are eliminated thoroughly thereby to produce a control signal immune to the harmonic currents.

The arrangement shown in FIG. 3 has a primary feature that the control circuit can be tested and adjusted through the simulated bus preparatory to the parallel operation without closing the output switch 104, but merely closing the switch 122, whereby testing, adjustment and inspection of the system are carried out easily.

The second feature is that the operating signal can be detected without any influence of a harmonic lateral current flowing between the main filter capacitors 103 of inverter units, whereby a stable control system can be designed easily.

In the above embodiment, the inverter main circuit is for three-phase, while the simulated bus circuit composed by transformer 120, reactor 121, capacitor 125, resistor 126 and etc. is for single-phase. This is based on the fact that the inverter usually controls for three phases in the lump, and therefore load sharing control is required only for a representative phase. Obviously, better high-response load balancing can be performed by provisison of the circuit shown in FIG. 3 for each of three phases.

Although the above described is devoted to a voltage-type inverter of a constant voltage, constant frequency and sinusoidal output waveform, the present invention can equally be applied to any power conversion systems of types such as current-type inverters and cycloconverters. The invention can also be applied to variable-frequency, variable-voltage inverters producing a switched output waveform, and to the arrangement including converter units of different power capacities.

According to the present inventiion as described above, the parallel operation control circuit can be tested and adjusted without actually connecting the main circuits in parallel, and also by using a synchronized rectification control circuit which does not use multipliers, a stable control system which is immune to a harmonic lateral current between the main circuits can be designed, whereby a reliable and inexpensive control circuit can be realized.

What is claimed is:

1. In a power conversion system including a plurality of converter units each having an output terminal connected to a load through a common bus, each of said converter units comprising:
   a converter circuit for converting a d.c. or a.c. input power into an a.c. output power of a desired voltage and frequency;
   an impedance element connected between the output terminal of said converter circut and said bus;
   a simulation bus circuit including a simulation impedance element connected to the output terminal of at least one converter pole of said converter circuit; and
   a means for controlling the output voltage and frequency of said converter circuit based on the current flowing in said simulation bus circuit, said simulation bus circuit having one end connected through a simulation bus to one end of a counterpart simulation impedance element of all remaining converter units.

2. A power conversion system according to claim 1, wherein said control means comprises a phase shifter to produce two perpendicularly-intersecting voltage vectors in response to the output voltage of said converter circuit to produce a reactive power component and effective power component, respectively, in response to the value of current flowing through said simulation bus circuit and said voltage vectors; and means for producing a control signal for controlling the output voltage and frequency of said converter circuit in response to the obtained reactive and effective power components.

3. A power conversion system according to claim 1, wherein said simulation impedance element in said simulation bus circuit comprises an insulation transformer connected to the output of said conversion circuit and a reactor connected in series to said transformer.

4. A power conversion system according to claim 1, wherein each of said converter units further comprises a capacitor which constitutes a first filter in conjunction with said impedance element, said simulation bus circuit further comprising a capacitor which constitutes a second filter in conjunction with said simulation impedance element.

5. A power conversion system according to claim 4, wherein said simulation bus circuit further comprises a damping resistor connected in series with said filter capacitor for preventing resonance of said capacitor with a counterpart capacitor included in another converter unit.

6. A power conversion system according to claim 4, wherein said simulation bus circuit further comprises a switch connected between said second filter and said simulation bus circuit.

7. A power conversion system according to claim 4, wherein said simulation bus circuit further comprises a damping resistor connected in series with said filter and said switch for preventing resonance of said filter capacitor with a counterpart capacitor included in another converter unit.

8. A power conversion system according to claim 4, wherein said simulation bus circuit further comprises a harmonics-eliminating filter connected between said second filter and said simulation bus circuit.

* * * * *

UNITED STATES PATENT AND TRADEMARK OFFICE
CERTIFICATE OF CORRECTION

PATENT NO. : 4,677,535

DATED : June 30, 1987

INVENTOR(S) : Takao Kawabata and Shigenori Higashino

It is certified that error appears in the above-identified patent and that said Letters Patent is hereby corrected as shown below:

Column 2, line 18, "including" should be --included--.

Column 4, line 68, "a" should be --the--.

Column 5, line 49, "provisison" should be --provision--;

line 61, "inventiion" should be --invention--.

Signed and Sealed this

Eighth Day of December, 1987

Attest:

DONALD J. QUIGG

Attesting Officer

Commissioner of Patents and Trademarks